Feb. 23, 1937.   L. H. KUHN ET AL   2,071,410
FREEZING, MIXING, AND CHOPPING MACHINE
Filed June 11, 1935   2 Sheets-Sheet 1
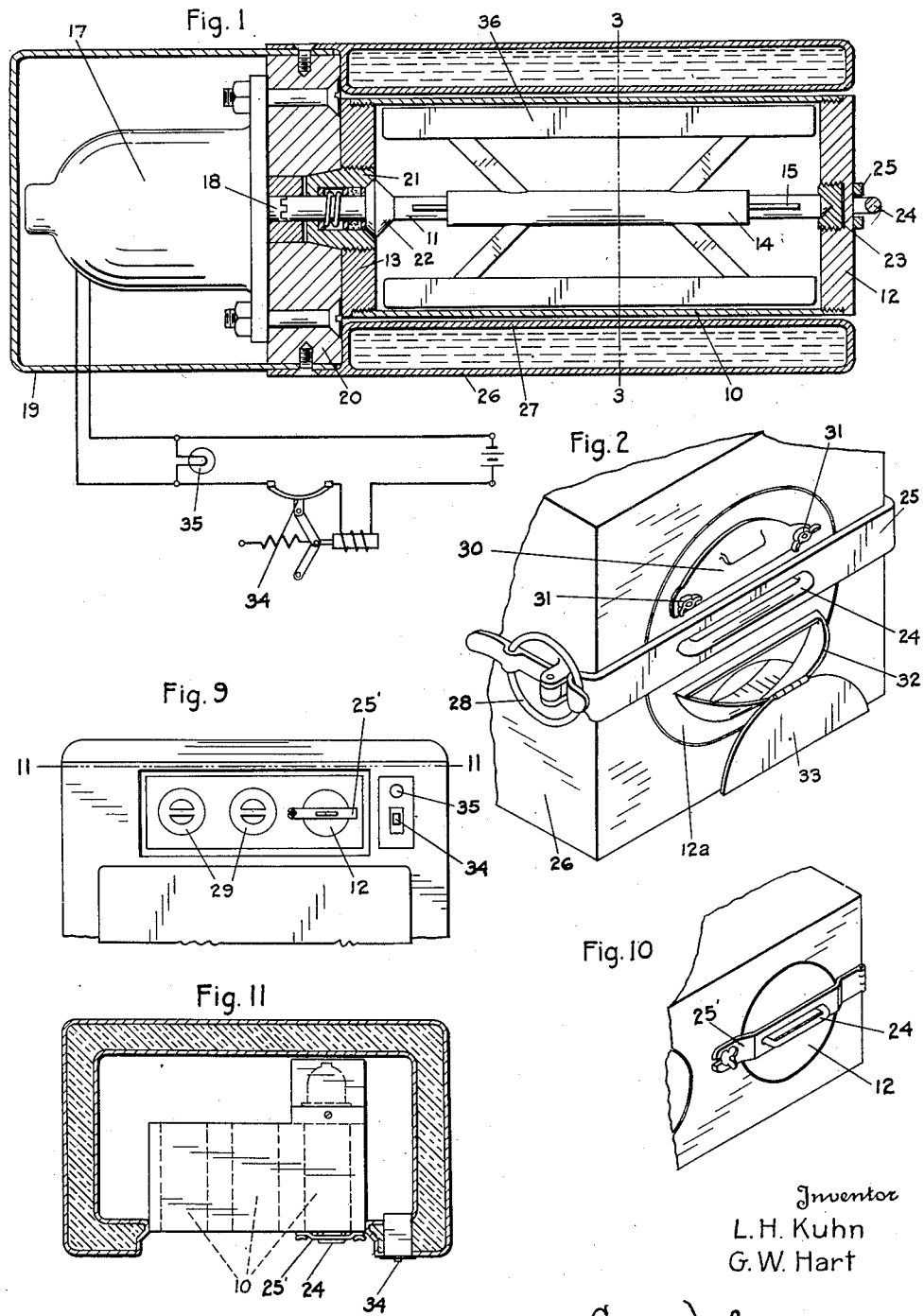
Inventor
L. H. Kuhn
G. W. Hart
By Emil F. Lange
Attorney

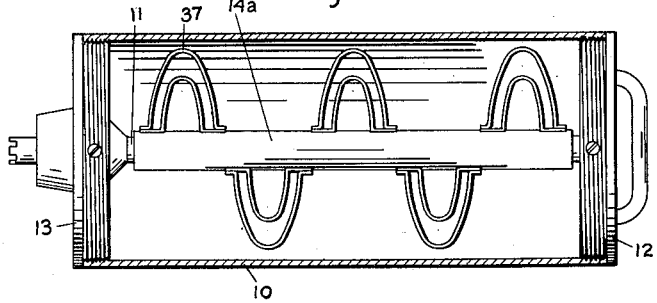
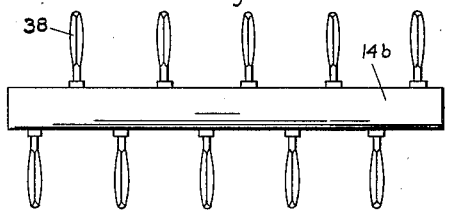
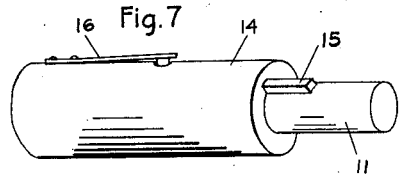
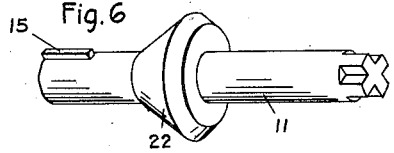
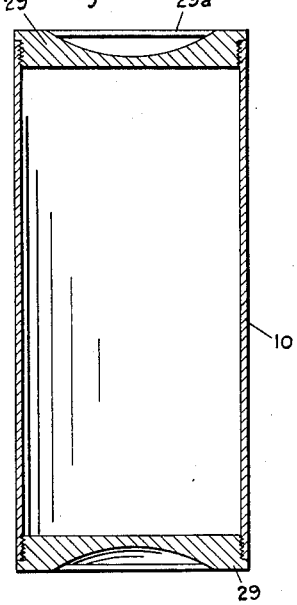
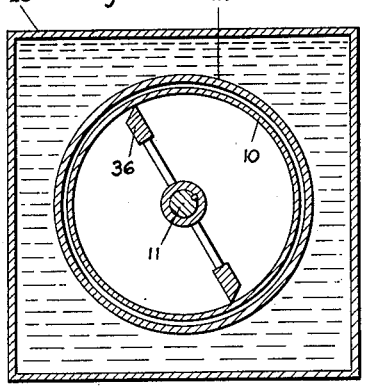

Patented Feb. 23, 1937

2,071,410

UNITED STATES PATENT OFFICE 2,071,410

FREEZING, MIXING, AND CHOPPING MACHINE

Lee H. Kuhn and Gilbert W. Hart, Lincoln, Nebr.

Application June 11, 1935, Serial No. 26,083

3 Claims. (Cl. 259—110)

Our invention relates to a device for utilizing the low temperatures of an electric refrigerator for freezing ice cream and confections or performing similar operations, the device being adapted for use outside the electric refrigerator as well as in the electric refrigerator.

An object of our invention is the provision of a device for freezing, stirring or cutting food in an electric refrigerator, the device utilizing space which is otherwise wasted in an electric refrigerator.

Another of our objects is the provision of a cylinder having a shaft which is adapted to engage any one of a plurality of kitchen utensils such as the dasher of an ice cream freezer, a cutter or a stirrer.

Another of our objects is the provision of a hollow cylinder having a shaft therein and adapted to be withdrawn with the shaft from the electric refrigerator and adapted when inserted in the refrigerator to engage the drive shaft for operating the rotary tool which is being used.

Another of our objects is the provision of an ice cream freezer or the like having a shaft in engagement with a motor driven shaft and provided with an overload circuit breaker with a signalling device for indicating a predetermined minimum stiffness of the ice cream.

Another of our objects is the provision of a cylindrical container which is insertable into an electric refrigerator and having a central rotating shaft together with means for preventing the rotation of the cylinder.

Another object which we have in view is the provision of a mechanism which will greatly increase the usefulness of electric refrigerators.

Still another object of our invention is the provision of a cylinder having a rotating central shaft with tools for performing various culinary operations, provision being also made for modified closures to adapt the cylinder for the storage of the food after treatment.

Having in view these objects and others which will be pointed out in the following description, we will now refer to the drawings, in which Figure 1 is a view partly in longitudinal section and partly in diagram showing our device in the form of a portable unit.

Figure 2 is a view in perspective of the feed end of the unit and showing the means for latching the unit against rotation.

Figure 3 is a sectional view taken on line 3—3 of Figure 1.

Figure 4 is a longitudinal sectional view of the cylindrical container with the shaft and with the stirring mechanism secured to the shaft.

Figure 5 is a similar view of the mechanism which may be secured to the shaft for cutting or chopping food.

Figure 6 is a view in perspective showing the rear end portion of the shaft and showing the bearing member which is employed in the parts which prevent the entrance of lubricant into the container.

Figure 7 is a perspective view of the shaft and of a portion of the sleeve of the tool, the view showing particularly the key for preventing a rotation of the tool about the shaft and showing also the latch for preventing endwise sliding movement of the sleeve on the shaft.

Figure 8 is a view in longitudinal section of the container shown in Figures 1 and 4, the container being provided with closures to adapt the container for use as a storage receptacle.

Figure 9 is a view in front elevation showing the electric refrigerator with our device secured thereto.

Figure 10 is a view similar to Figure 2 but showing a slight modification.

Figure 11 is a view in horizontal section of the refrigerator on the line 11—11 of Figure 9.

The cylindrical container 10 is common to all forms of our device and it is adapted for the various uses to which our device may be put. As shown in Figure 4, the container 10 has a central shaft 11 and it is provided with internal screw-threads for the reception of the end closures 12 and 13. The shaft 11 carries a sleeve 14 as shown in Figure 1, the sleeve being secured against rotation by means of the key 15 which is shown in perspective in Figures 6 and 7. The sleeve 14 is also provided with a latch 16 having a pin at its free extremity for entering an aperture in the sleeve 14 to engage the shaft 11 and to thus prevent endwise sliding movement of the sleeve 14 on the shaft 11.

The shaft 11 is driven by a motor 17 through its shaft 18 or by any equivalent drive shaft. For this purpose the shafts 11 and 18 are provided with clutch members as shown in Figures 1, 3 and 4, these clutch members being automatically engageable when the cylinder 10 is placed in operative position as shown in Figure 1. The motor 17 is encased in a frame 19 having an end portion 20 in the form of a block to which the motor is firmly secured. This frame 19 may be secured to the casing of the electric refrigerator in the manner shown in Figure 10 or it may be used as a portable unit as shown in Figure 1.

No claim is made to the motor 17, however, the only important feature as regards our invention being the drive shaft 18 for automatically engaging the shaft 11 for rotation thereof. It is obvious that this shaft 18 may be otherwise positioned within the electric refrigerator and otherwise driven from any suitable source of power. The parts must be so arranged, however, that the positioning of the cylindrical container 10 will automatically cause the clutch engagement of the shafts 11 and 18.

The rear end wall 13 of the cylindrical container 10 is provided with a bearing block 21 which is screw-threaded into the end member 13 as shown in Figure 1. The shaft 11 has a double frusto-conical member 22 which seats in the reamed aperture of the bearing block 21. A socket in the bearing block 21 is provided with washers and packing with a coiled spring as shown in Figure 1 for imparting a forward thrust to the washers and packing to prevent the entrance of lubricant into the container and to maintain the shaft 11 in its effective position for operation. The shaft 11 has a conical forward extremity with a conical bearing in the bearing block 23 in the forward closure 12. To prevent turning of the cylindrical container 10 due to the friction, we provide a bail 24 in the forward closure 12 with a strap 25 having a slot for seating over the bail 24, the strap 25 being maintained in horizontal position by means to be subsequently described.

The unit shown in Figures 1 and 3 may be used as a portable unit either in the electric refrigerator or independently thereof. Surrounding the cylindrical container is a hollow casing having outer walls 26 in square relation as shown in Figure 3 and having an inner cylindrical wall 27. The inner cylindrical wall has a diameter such that the cylindrical container may be slidably inserted into or withdrawn from the outer casing. Between the walls 26 and 27 there is a hollow space for the reception of the refrigerant which may be in the form of ice or cold brine. When used as a portable unit as shown in Figure 2, the means for preventing the turning of the cylindrical container 10 are such as shown in Figure 2, one end of the strap 25 being secured to a side wall of the outer casing and the other end having a latch 28 for clamping the strap 25 in position. The portable unit shown in Figure 2 is, however, adapted for use in a refrigerator with an opening of a size to admit the outer casing. When thus used the clamping member of Figure 10 is preferred over that shown in Figure 2.

The cylindrical container 10 is adapted to function also as a storage container. If the quantity desired is greater than that which can be frozen in a single container 10, it is necessary to repeat the operation as many times as is necessary and to store the material after each freezing. For this purpose we provide closures 29 as shown in Figure 8 which are screw-threaded to engage the screw threads of the cylindrical container 10. Each of these closures 29 is so arranged that the container may be set on end and each closure also has a concave outer portion with a hand member 29a for convenience in grasping. To freeze several batches of material it is only necessary to arrange the parts as shown in Figure 1 until the freezing has been completed, to then remove both end closures with the shaft and dasher and to insert them in another container having material ready to be frozen. The container 10 thus removed is then closed by means of the closures 29 and it may be then stored in the refrigerator or any convenient place. In Figure 9 we show our preferred form of arrangement with certain types of refrigerators. In this case the unit is adapted to receive three cylindrical containers 10 but only one of these positions is equipped with a shaft for actuating the freezer as shown in Figure 11. In Figure 9 only the forward end portions of the cylindrical containers are shown, the one with the forward end portion 12 being the operating container while the two with the forward end walls 29 being the storage containers. When the unit is to be used in a refrigerator in the manner shown in Figure 9, the horizontal strap 25 must be slightly modified as shown in Figure 10.

In Figure 2 we show two slight modifications of the forward end closure 12a. In this construction the forward end wall 12a is provided with openings in both its upper and lower segments. The upper opening is closed by an inspection plate 30 which is secured to the end wall by means of thumb nuts 31. One of these thumb nuts serves as a pivot for the inspection plate 30 but the other operates in an arcuate slot in the inspection plate to latch the inspection plate against the end wall 12a. The lower opening in the front closure 12a is provided with a funnel 32 for the introduction of the material to the cylinder. This funnel is operative for the introduction of material even when the motor and the shaft 11 are in operation. In order to prevent slopping of the contents this funnel has a hinged closure 33 as shown in Figure 2.

The freezing of material becomes more difficult as the material in the cylindrical container becomes stiffened. The result of this is that the motor draws more and more heavily on the current which supplies the motor. We have therefore provided a signal which is adjustable and which indicates to the user that the operation has automatically stopped. Figure 1 shows in diagrammatic form an overload circuit breaker 34 for breaking the circuit at a predetermined resistance encountered by the shaft. The breaking of this circuit operates a signal 35 such as a bulb or other suitable indicator.

It is obvious that the mechanism with the exception of the dasher 36 may be made to function in other culinary operations. We therefore provide a number of utensils which may be used interchangeably on the shaft 11. In Figure 4 is shown a stirrer or beater 37 on the sleeve 14a which is similar to the sleeve 14. Eggs can be beaten and cream can be whipped much more readily when cold than when warm. For beating eggs or whipping cream the cylindrical container with the shaft 11 is employed together with the beater 37. Likewise fruit and vegetables may be chopped by the use of our mechanism by simply substituting the sleeve 14b with its cutter 38 for the dasher 36.

Having thus described our invention in such full, clear, and exact terms that its construction and operation will be readily understood by others skilled in the art to which it pertains, what we claim as new and desire to secure by Letters Patent of the United States is:

1. A casing having a cylindrical chamber, a cylindrical food container insertable into said chamber, a rotatable food agitator within said food container, a screw-threaded disc closure for the opening of said food container, a horizontal bail handle projecting outwardly from said disc closure, and a strap releasably secured to said casing to extend across said disc closure, said strap being provided with a slot for engaging said bail handle to prevent sliding and turning movements of said food container.

2. A casing having a cylindrical chamber with an opening in the forward wall thereof, a cylindrical food container insertable into said chamber, forward and rear closures for said cylindrical food container, a rotatable food agitator within said food container, means releasably secured to said casing and to said forward closure for preventing the accidental turning of said food container, said forward closure being provided with segmental upper and lower openings, a plate releasably secured to said forward closure for closing the upper opening thereof, and a funnel secured to said forward closure adjacent the lower opening thereof for introducing material into said food container.

3. A casing and a support therefor, a cylindrical chamber within said casing and having an opening in the front wall of said casing, a drive shaft secured to and having bearing in said support, a cylindrical food receptacle slidable into and out of said cylindrical chamber, forward and rear screw-threaded disc closures for said cylindrical food container, a conical socket in the inner side of said forward closure, said rear closure being provided with a central aperture, a driven shaft passing through the aperture of said rear closure and having a thrust bearing in the conical socket of said forward closure, said driven shaft being in alignment with said drive shaft and having means at its rear extremity for engaging said drive shaft when said food container is inserted into said cylindrical chamber, a culinary utensil releasably secured to said driven shaft and rotatable therewith, a horizontal bail handle projecting outwardly from said disc closure, a strap releasably secured to the forward wall of said casing to extend across said disc closure, said strap being provided with a slot for engaging said bail handle to prevent sliding and turning movements of said food container, said forward closure being provided with segmental upper and lower openings, a plate releasably secured to said forward closure for closing the upper segmental opening thereof, and a funnel secured to said forward closure adjacent the lower segmental opening thereof for introducing material into said food container.

LEE H. KUHN.
GILBERT W. HART.